United States Patent
Muth et al.

(10) Patent No.: US 8,636,862 B2
(45) Date of Patent: Jan. 28, 2014

(54) METHOD FOR PRODUCING A POLYCARBONATE LAYERED COMPOSITE

(75) Inventors: Oliver Muth, Berlin (DE); Andre Leopold, Berlin (DE); Malte Pflughhoefft, Berlin (DE); Jorg Fischer, Berlin (DE); Manfred Paeschke, Basdorf (DE); Heinz Pudleiner, Krefeld (DE); Cengiz Yesildag, Leverkusen (DE); Klaus Meyer, Dormagen (DE)

(73) Assignees: Bundesdruckerei GmbH (DE); Bayer Material Science AG (DE)

( * ) Notice: Subject to any disclaimer, the term of this patent is extended or adjusted under 35 U.S.C. 154(b) by 491 days.

(21) Appl. No.: 12/740,695

(22) PCT Filed: Oct. 29, 2008

(86) PCT No.: PCT/DE2008/001752
§ 371 (c)(1),
(2), (4) Date: Aug. 2, 2010

(87) PCT Pub. No.: WO2009/056111
PCT Pub. Date: May 7, 2009

(65) Prior Publication Data
US 2010/0310812 A1    Dec. 9, 2010

(30) Foreign Application Priority Data
Oct. 31, 2007  (DE) .......................... 10 2007 052 948

(51) Int. Cl.
*B32B 3/08*     (2006.01)
*B32B 37/14*    (2006.01)
*B42D 15/10*    (2006.01)

(52) U.S. Cl.
USPC ......... 156/60; 156/1; 428/60; 428/68; 428/76

(58) Field of Classification Search
USPC ........................................ 156/60; 428/76, 68
See application file for complete search history.

(56) References Cited

U.S. PATENT DOCUMENTS

| 2,970,131 A | 1/1961 | Moyer et al. |
| 2,991,273 A | 7/1961 | Hechelhammer et al. |

(Continued)

FOREIGN PATENT DOCUMENTS

| DE | 1570703 | 2/1970 |
| DE | 2063050 | 7/1972 |

(Continued)

OTHER PUBLICATIONS

"Chemistry and Physics of Polycarbonates", Hermann Schnell, Interscience Publishers, 1964, pp. 27-98.

(Continued)

*Primary Examiner* — Brent O'Hern
(74) *Attorney, Agent, or Firm* — Ann Wieczorek; Mayer & Williams PC (57) ABSTRACT

The invention relates to a method for making a structure with at least a first polymer layer and a second polymer layer, each made from a polycarbonate polymer based on bisphenol A, between the polymer layers a component being arranged, comprising the following steps: a) the component is arranged on the first polymer layer or placed in a depression of the first polymer layer, b) the first polymer layer is coated on the side, on which or in which the component is arranged, at least in the region of the component with a liquid preparation comprising a solvent or a mixture of solvents and a polycarbonate derivative based on a geminally disubstituted dihydroxydiphenyl cycloalkane, c) optionally a drying step is made after step b), d) after step b) or step c), the second polymer layer is placed on the first polymer layer, covering the component, e) the first polymer layer and the second polymer layer are laminated with each other under pressure, at a temperature from 120° C. to 180° C. and for a defined time.

27 Claims, 4 Drawing Sheets

(56) References Cited

U.S. PATENT DOCUMENTS

| | | | |
|---|---|---|---|
| 2,999,835 | A | 9/1961 | Goldberg et al. |
| 2,999,846 | A | 9/1961 | Schnell et al. |
| 3,028,365 | A | 4/1962 | Schnell et al. |
| 3,062,781 | A | 11/1962 | Bottenbruch et al. |
| 3,148,172 | A | 9/1964 | Fox et al. |
| 3,271,367 | A | 9/1966 | Schnell et al. |
| 3,275,601 | A | 9/1966 | Schnell et al. |
| 5,648,414 | A * | 7/1997 | Bier et al. .................... 524/323 |

FOREIGN PATENT DOCUMENTS

| | | |
|---|---|---|
| DE | 2063052 | 7/1972 |
| DE | 2211956 | 10/1973 |
| DE | 297605 | 1/1992 |
| DE | 4421561 | 12/1995 |
| DE | 4424106 | 1/1996 |
| DE | 10013410 | 9/2001 |
| DE | 10159373 | 6/2003 |
| EP | 0688839 A2 | 12/1995 |
| FR | 1561518 | 3/1969 |

OTHER PUBLICATIONS

"Optical Document Security", Rudolf L. Van Renesse, Artech House, 2005, pp. 1-366 (Document in 4 Parts).

* cited by examiner

METHOD FOR PRODUCING A POLYCARBONATE LAYERED COMPOSITE

FIELD OF THE INVENTION

The invention relates to a method for making a structure with at least a first polymer layer and a second polymer layer each made from a polycarbonate polymer based on bisphenol A, between the polymer layers a component being arranged, comprising the following steps: the component is arranged on the first polymer layer or placed in a depression of the first polymer layer, then the second polymer layer is placed on the first polymer layer, covering the component, and the first polymer layer and the second polymer layer are laminated with each other under pressure, at an increased temperature and for a defined time. The invention further relates to a structure obtainable in this way, to the use of the method for making a security and/or value document, and to a security and/or value document to be thus made.

BACKGROUND OF THE INVENTION AND PRIOR ART

When integrating electronic components, in particular integrated semiconductors (IC's), but also chip modules, displays, batteries, coils, capacitors, contact points etc. in polycarbonate (PC) based documents, there is, for instance for thin semiconductor structures, a problem of premature destruction or reduced of life time of the components during the lamination by thermal and mechanical overload or stress. In prior art methods of the above kind, for instance for producing PC smart cards by lamination of individual film layers, the positioning of a PC film is made directly over the chip. In the industrially established approach, the prepared card structures are pressed together under the simultaneous action of temperature and pressure to form a "quasi-monolithic" block. Since PC does not immediately soften due to its specific heat transfer coefficient and its relatively high glass temperature $T_g$, there is an increased mechanical pressure directly at the chip, this pressure leading in most cases to a mechanical destruction of the chip.

For avoiding this problem, it is known in the art to apply self-adhesive or elastic films on the electronic components, thus the PC films with interposed components, such as chips, can be combined to a card without a high risk of destruction of the component. Normally, these adhesive layers are a weak point of the card structure. Through the card edge, water vapor and air can easily enter and thus lead to a later delamination. Other environmental influences, in particular high temperatures, but also fast temperature changes may lead to that card splits open and cannot be used any longer. Furthermore, adhesive films with a thickness <50 µm can only difficultly or not at all be handled on an industrial scale, and are inflexible, when it is important, e.g., to fill up cavities. Similar considerations apply to components having diffractive structures, e.g. volume holograms. If the hologram is directly laminated with further PC films to form a card, this will happen under certain circumstances under visible and measurable losses of the representation quality of the hologram, in particular of the colors and the 3-dimensional appearance. Most volume holograms based on photopolymers have a softening point or glass temperature $T_g$ of clearly below 150° C. If during the lamination the PC films being still hard at the beginning are pressed on the soft photopolymer of the hologram, the Bragg planes are displaced, and certain elements appear to be displaced in their wavelengths. For instance, green picture elements will become yellow picture elements etc. Further, in particular for volume holograms, the 3-dimensional appearance is clearly reduced, and the holograms seem to be rather flat and 2-dimensional and washed-out. These effects, too, are based on the problem that either the "hard" PC is placed on brittle surfaces and causes mechanical stress or deforms softer bodies, for instance made from a photopolymer, thus these components being impaired in their function.

From the document EP 0688839 A2, polycarbonates based on a geminally disubstituted dihydroxydiphenyl cycloalkane are per se known. In this prior art, such polycarbonates are used as binding agents of silk-screen printing inks. From this document can also be taken methods for making such polycarbonates. This document with its complete contents is hereby included in the scope of disclosure of the present application.

TECHNICAL OBJECT OF THE INVENTION

It is therefore the technical object of the invention to provide a method for laminating a temperature and/or pressure-sensitive component between two polymer layers of a polycarbonate, wherein damages or impairments of the component are reduced or prevented, but nevertheless a very high integrity and durability of the produced structure being secured.

BASICS OF THE INVENTION AND PREFERRED EMBODIMENTS

For achieving this technical object, the invention teaches a method for making a structure with at least a first polymer layer and a second polymer layer, each made from a polycarbonate polymer based on bisphenol A, between the polymer layers a component being arranged, comprising the following steps: a) the component is arranged on the first polymer layer or placed in a depression of the first polymer layer, b) the first polymer layer is coated on the side, on which or in which the component is arranged, at least in the region of the component with a liquid preparation comprising a solvent or a mixture of solvents and a polycarbonate derivative based on a geminally disubstituted dihydroxydiphenyl cycloalkane, c) optionally a drying step is made after step b), d) after step b) or step c), the second polymer layer is placed on the first polymer layer, covering the component, e) the first polymer layer and the second polymer layer are laminated with each other under pressure, at a temperature from 120° C. to 200° C. or 220° C. and for a defined time.

The invention is based on the finding that polycarbonate derivatives used according to the invention will become free-flowing already at temperatures below the usual softening point of polycarbonate materials for films and other layers (polycarbonate based on bisphenol A, $T_g$ approx. 150° C.) and at the same time are highly compatible with polycarbonate materials for films, such as for instance Makrofol® films. The free-flowing behavior already at lower temperatures than the standard lamination temperatures will lead to that the components are stressed to a lower degree at the beginning of the lamination, when a pressure is already applied, but the multilayer structure to be laminated is not yet heated up to the lamination temperature. The high compatibility is shown by that the layer provided according to the invention with a polycarbonate derivative combines with the polycarbonate materials of the films to form a monolithic structure. A layer boundary between the materials cannot optically be detected anymore after the lamination. The lamination protecting the components in connection with the high compatibility may also be based, without being bound to a specific theory, on that surprisingly in the polycarbonate derivative, a change of phase may occur after a first heating-up, during said change of phase the glass temperature $T_g$ rising to values, which are close to those of polycarbonate based on bisphenol A.

As a result, the polycarbonate derivatives used according to the invention permit the combination or lamination under inclusion of pressure and temperature-sensitive components, the polycarbonate derivative apart from that behaving, after exposure to temperature (e.g. during a lamination), like a "pure" polycarbonate based on bisphenol A.

Another advantage of the invention is that the liquid preparations used according to the invention, in particular solutions, can be applied by printing techniques and can therefore be employed for the conventional printing methods (e.g. screen, gravure, letterpress and flat printing, but also ink jet printing) with the respective (low) lateral layer thicknesses. This will lead, compared to adhesive films to be applied on the surface, to substantial savings of material. Commercially available adhesion systems (e.g. based on epoxides) can theoretically also be printed, would however change color during lamination or lose their adhesive properties.

The printing method also permits a position-resolved, non-full-surface application, and different layer thicknesses in a position-resolved manner.

In addition to printing, the liquid preparations also can be knife-coated, dispensed, sprayed, cast or spread.

In principle, arbitrary components can be used for the invention. The advantages according to the invention will however have a favorable effect in particular on components, which are mechanically and/or thermally sensitive, such as electronic components or (volume) holograms. Electronic components are for instance thick-film integrated circuits, thick-film circuits, circuits comprising several discrete active and passive components, sensors, chip modules, displays, batteries, coils, capacitors, contact points and many others.

The specific pressure (pressure at the workpiece) in step e) is typically in the range from 1 bar to 10 bars, in particular in the range from 3 bars to 7 bars. The temperature in step e) is preferably in the range from 140° C. to 180° C., in particular in the range from 150° C. to 170° C. The time of the step e) may be in the range from 0.5 s to 45 min, in particular from 10 to 30 min.

In step c), drying may be performed at a temperature in the range from 20° C. to 120° C., in particular from 60° C. to 120° C., preferably from 80° C. to 110° C., for a time of at least 1 min, preferably 5 min to 600 min, in particular from 10 min to 120 min.

The layer thickness generated in step b) (before or after drying) is for instance in the range from 0.1 μm to 50 μm, preferably from 1 μm to 10 μm, in particular from 2 μm to 5 μm.

The used polymer layers may have thicknesses in the range from 20 μm to 1,000 μm, in particular from 50 μm to 300 μm. If a depression is provided in step a), the depth thereof may be from 10% to 100% of the thickness of the polymer layer.

Typical absolute values of the depression are in most cases in the range from 5 μm to 50 μm.

It is preferred, if the polycarbonate derivative has an average molecular weight (mean weight) of at least 10,000, preferably from 20,000 to 300,000.

In detail, the polycarbonate derivative may contain functional carbonate structure units of formula (I), wherein $R^1$ and $R^2$ are independently from each other hydrogen, halogen, preferably chlorine or bromine, $C_1$-$C_8$ alkyl, $C_5$-$C_6$ cycloalkyl, $C_6$-$C_{10}$ aryl, preferably phenyl, and $C_7$-$C_{12}$ aralkyl, preferably phenyl-$C_1$-$C_4$ alkyl, in particular benzyl; m is an integer from 4 to 7, preferably 4 or 5; $R^3$ and $R^4$ can be individually selected for each X, and independently represent hydrogen or $C_1$-$C_6$ alkyl; X is carbon and n an integer greater than 20, with the proviso that at least at one atom X, $R^3$ and $R^4$ are both alkyl.

Further, it is preferred, if at 1 to 2 atoms X, in particular at one atom X only, $R^3$ and $R^4$ both are alkyl. $R^3$ and $R^4$ may in particular be methyl. The X atoms in the alpha position to the diphenyl-substituted C atom (C1) cannot be dialkyl-substituted. The X atoms in the beta position to C1 can be disubstituted with alkyl. Preferably is m=4 or 5. The polycarbonate derivative may for instance be formed based on monomers, such as 4,4'-(3,3,5-trimethyl cyclohexane-1,1-diyl)diphenol, 4,4'-(3,3-dimethyl cyclohexane-1,1-diyl)diphenol, or 4,4'-(2,4,4-trimethyl cyclopentane-1,1-diyl)diphenol.

A polycarbonate derivative according to the invention may for instance be made from diphenols of formula (Ia) according to the document DE 38 32 396.6, the scope of disclosure of which with its complete contents is hereby included in the scope of disclosure of this description.

A diphenol of formula (Ia) under formation of homopolycarbonates as well as several diphenols of formula (Ia) under formation of copolycarbonates can be used (the meaning of radicals, groups and parameters same as in formula I).

Furthermore, the diphenols of formula (Ia) can also be used in a mixture with other diphenols, for instance with those of formula (Ib)

$$HO-Z-OH \quad (Ib),$$

for making high-molecular, thermoplastic, aromatic polycarbonate derivatives.

Suitable other diphenols of formula (Ib) are those, wherein Z is an aromatic radical with 6 to 30 C atoms, which may contain one or several aromatic nuclei, be substituted and contain aliphatic radicals or other cycloaliphatic radicals than those of formula (Ia) or heteroatoms as bridge members.

Examples for the diphenols of formula (Ib) are: hydroquinone, resorcin, dihydroxydiphenyls, bi-(hydroxyphenyl)-alkenes, bis-(hydroxyphenyl)-cycloalkanes, bis-(hydroxyphenyl)-sulfides, bis-(hydroxyphenyl)-ethers, bis-(hydroxyphenyl)-ketones, bis-(hydroxyphenyl)-sulfones, bis-(hydroxyphenyl)-sulfoxides, alpha,alpha'-bis-(hydroxyphenyl)-diisopropylbenzenes and their nuclear-alkylated and nuclear-halogenated compounds.

These and other suitable diphenols are e.g. described in the documents U.S. Pat. Nos. 3,028,365, 2,999,835, 3,148,172, 3,275,601, 2,991,273, 3,271,367, 3,062,781, 2,970,131 and 2,999,846, in the documents DE-A 1 570 703, 2 063 050, 2 063 052, 2 211 956, the FR-A 1 561 518 and in the monograph "H. Schnell, *Chemistry and Physics of Polycarbonates*, Interscience Publishers, New York 1964", which with its complete contents is hereby included in the scope of disclosure of the present application.

Preferred other diphenols are for instance: 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-cyclohexane, alpha,alpha-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfone, 2,4-bis-(3,5-dimethyl-4-hydroxyphenyl)-2-methylbutane, 1,1-bis-(3,5-dimethyl-4-hydroxyphenyl)-cyclohexane, alpha,alpha-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Particularly preferred diphenols of formula (Ib) are for instance: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane. In particular, 2,2-bis-(4-hydroxyphenyl)-propane is preferred. The other diphenols may be used individually as well as in a mixture.

The molar ratio of diphenols of formula (Ia) to, if applicable, the also used other diphenols of formula (Ib) should be between 100 mol % (Ia) to 0 mol % (Ib) and 2 mol % (Ia) to 98 mol % (Ib), preferably between 100 mol % (Ia) to 0 mol % (Ib) and 10 mol % (Ia) to 90 mol % (Ib) and in particular between 100 mol % (Ia) to 0 mol % (Ib) and 30 mol % (Ia) to 70 mol % (Ib).

The high-molecular polycarbonates from the diphenols of formula (Ia), if applicable, in combination with other diphenols, may be made according to the known polycarbonate production methods. The different diphenols may be linked in a statistical manner as well as also block-wise.

The polycarbonate derivatives used according to the invention may be branched in a per se known manner. If the branching is desired, this can be achieved in a per se known manner by condensation of small amounts, preferably amounts between 0.05 and 2.0 mol % (referred to the used diphenols), of three or more than three-functional compounds, in particular such with three or more than three phenolic hydroxyl groups. Some branching agents with three or more than three phenolic hydroxyl groups are: phloroglucin, 4,6-dimethyl-2,4,6-tri-(4-hydroxyphenyl)-heptene-2,4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-is-(2-hydroxy-5-methyl-benzyl)-4-methylphenol, 2-(4-hydroxyphenyl)-2-(2,4-dihydroxyphenyl)-propane, hexa-[4-(4-hydroxyphenyl-isopropyl)-phenyl]-orthoterephthalic acid ester, tetra-(4-hydroxyphenyl)-methane, tetra-[4-(4-hydroxyphenyl-isopropyl)phenoxy]-methane and 1,4-bis-[4',4''-dihydroxytriphenyl)-methyl]-benzene. Some of the other three-functional compounds are 2,4-dihydroxy benzoic acid, trimesic acid, cyanuric chloride and 3,3-bis-(3-methyl-4-hydroxyphenyl)-2-oxo-2,3-dihydroindol.

As chain stoppers for the per se known control of the molecular weight of the polycarbonate derivatives are used monofunctional compounds in usual concentrations. Suitable compounds are e.g. phenol, tert-butylphenols or other alkyl-substituted phenols. For controlling the molecular weight, in particular small amounts of phenols of formula (Ic) are suitable (Ic)

wherein R is a branched C8 and/or C9-alkyl radical.

Preferably the share of the $CH_3$ protons in the alkyl radical R is between 47 and 89% and the share of the CH and $CH_2$ protons is between 53 and 11%; also preferably R is in an o and/or p position to the OH group, and particularly preferably the upper limit of the ortho share is 20%. The chain stoppers are used in general in amounts from 0.5 to 10, preferably 1.5 to 8 mol %, referred to the used diphenols.

The polycarbonate derivatives may preferably be made according to the phase boundary method (cf. H. Schnell *Chemistry and Physics of Polycarbonates*, Polymer Reviews, Vol. IX, page 33ff., Interscience Publ. 1964) in a per se known manner.

Herein, the diphenols of formula (Ia) are dissolved in an aqueous alkaline phase. For making copolycarbonates with other diphenols, mixtures of diphenols of formula (Ia) and the other diphenols, for instance those of formula (Ib), are used. For controlling the molecular weight, chain stoppers e.g. of formula (Ic) may be added. Then a reaction is performed in presence of an inert, preferably polycarbonate-dissolving, organic phase with phosgene according to the method of the phase boundary condensation. The reaction temperature is between 0° C. and 40° C.

If applicable, the used branching agents (preferably 0.05 to 2.0 mol %) may either be presented with the diphenols in the aqueous alkaline phase or may be added dissolved in the organic solvent before the phosgenation. Beside the diphenols of formula (Ia) and, if applicable, other diphenols (Ib), thus their mono and/or bis-chlorocarbonic acid esters can also be used, the latter being added dissolved in organic solvents. The amount of chain stoppers and of branching agents then depends on the molar amount of diphenolate radicals corresponding to formula (Ia) and, if applicable, formula (Ib); when chlorocarbonic acid esters are also used, the amount of phosgene can correspondingly be reduced in a known manner.

Suitable organic solvents for the chain stoppers and, if applicable, for the branching agents and the chlorocarbonic acid esters are for instance methylene chloride, chlorobenzene and in particular mixtures of methylene chloride and chlorobenzene. If applicable, the used chain stoppers and branching agents can be dissolved in the same solvent.

As an organic phase for the phase boundary polycondensation serve for instance methylene chloride, chlorobenzene and mixtures of methylene chloride and chlorobenzene.

As an aqueous alkaline phase serves for instance a NaOH solution. Making the polycarbonate derivatives according to the phase boundary method can by catalyzed in a usual manner by catalyzers such as tertiary amines, in particular tertiary aliphatic amines such as tributylamine or triethylamine; the catalyzers can be used in amounts from 0.05 to 10 mol %, referred to the moles of used diphenols. The catalyzers can be added before the phosgenation or during or also after the phosgenation.

The polycarbonate derivatives can be made according to the known method in a homogeneous phase, the so-called "pyridine method" and according to the known method for the transesterification of molten mass by using for instance diphenyl carbonate instead of phosgene.

The polycarbonate derivatives may be linear or branched, they are homopolycarbonates or copolycarbonates based on the diphenols of formula (Ia).

By the arbitrary composition with other diphenols, in particular with those of formula (Ib), the polycarbonate properties can be varied in a favorable manner. In such copolycarbonates, the diphenols of formula (Ia) are contained in polycarbonate derivatives in amounts from 100 mol % to 2 mol %, preferably in amounts from 100 mol % to 10 mol % and in particular in amounts from 100 mol % to 30 mol %, referred to the total amount of 100 mol % of diphenol units.

A particularly advantageous embodiment of the invention is characterized by that the polycarbonate derivative comprises a copolymer in particular consisting of monomer units M1 based on formula (Ib), preferably bisphenol A, and monomer units M2 based on the geminally disubstituted dihydroxydiphenyl cycloalkane, preferably of the 4,4'-(3,3,5-trimethyl cyclohexane-1,1-diyl)diphenol, wherein the molar ratio M2/M1 is preferably greater than 0.5. For such copolymers it has namely been found that surprisingly the glass temperature Tg is below 150° C. after a first heating cycle and may be increased in a second heating cycle, which substantially improves the stability of the obtained structure.

Very particularly preferred is a liquid preparation comprising: A) 1 to 30 wt %, preferably 10 to 25 wt %, in particular 15 to 20 wt %, of a polycarbonate derivate used according to the invention, and B) 70 to 99 wt %, preferably 75 to 90 wt %, in particular 80 to 85 wt %, of an organic solvent or of a mixture of solvents.

The liquid preparation may comprise so-called functional materials. These are materials familiar to the man skilled in the art (cf. also van Renesse, *Optical Document Security*, 3rd ed., Artech House, 2005), which are used for the protection of value and security documents. Thereto belong luminescent substances (dyes or pigments, organic or inorganic) such as e.g. photoluminophores, electroluminophores, anti-Stokes luminophores, fluorophores, but also magnetizable, photoacoustically addressable or piezoelectric materials. This comprises fluorescent as well as phosphorescent substances. Furthermore, Raman-active or Raman-amplifying materials can be used, same as so-called barcode materials.

The used organic solvents are preferably halogen-free solvents. These may in particular be aliphatic, cycloaliphatic, aromatic hydrocarbons, such as mesitylene, 1,2,4-trimethylbenzene, cumene and solvent naphtha, toluene, xylene; (organic) esters, such as methylacetate, ethylacetate, butylacetate, methoxypropylacetate, ethyl-3-ethoxypropionate. Preferred are mesitylene, 1,2,4-trimethylbenzene, cumene and solvent naphtha, toluene, xylene, acetic acid methyl ester, acetic acid ethyl ester, methoxypropylacetate, ethyl-3-ethoxypropionate. Particularly preferred are: mesitylene (1,3,5-trimethylbenzene), 1,2,4-trimethylbenzene, cumene (2-phenylpropane), solvent naphtha and ethyl-3-ethoxypropionate.

A suitable mixture of solvents comprises for instance A) 0 to 10 wt %, preferably 1 to 5 wt %, in particular 2 to 3 wt %, of mesitylene, B) 10 to 50 wt %, preferably 25 to 50 wt %, in particular 30 to 40 wt %, of 1-methoxy-2-propanolacetate, C) 0 to 20 wt %, preferably 1 to 20 wt %, in particular 7 to 15 wt %, of 1,2,4-trimethylbenzene, D) 10 to 50 wt %, preferably 25 to 50 wt %, in particular 30 to 40 wt %, of ethyl-3-ethoxypropionate, E) 0 to 10 wt %, preferably 0.01 to 2 wt %, in particular 0.05 to 0.5 wt %, of cumene, and 0 to 80 wt %, preferably 1 to 40 wt %, in particular 15 to 25 wt %, of solvent naphtha, the relative amounts of the components A) to E) always totaling 100 wt %.

For reasons of low temperature stress on the component, it is preferred if the temperature in step e) is in the range from 120° C. to 220° C., in particular from 120° C. to 200° C. At the beginning of step e), the temperature may be from 120° C. to 150° C., and at the end of step e) from 150° C. to 200° C. or 220° C.

Typically the first polycarbonate layer and the second polycarbonate layer have a glass temperature Tg of more than 145° C., in particular more than 147° C.

The thickness of the first polycarbonate layer and of the second polycarbonate layer may be identical or different, in the range from 10 to 1,000 µm, in particular from 20 to 200 µm. The thickness, measured in directions orthogonal to a main face of a polycarbonate layer, of the component is for instance in the range from 0.1 to 50 µm, in particular from 1 to 30 µm.

The invention further relates to a structure, which can be obtained by a method according to the invention. As structural features, such a structure may comprise a first polycarbonate layer, a second polycarbonate layer, a component arranged between the first polycarbonate layer and the second polycarbonate layer and an intermediate layer connecting the first polycarbonate layer to the second polycarbonate layer and comprising a polycarbonate derivative based on a geminally disubstituted dihydroxydiphenyl cycloalkane, the polycarbonate layers and the intermediate layer being firmly bonded with each other.

The invention further relates to the use of a method according to the invention for making a security and/or value document, wherein optionally simultaneously with, before or after the production of the structure, the first polycarbonate layer and/or the second polycarbonate layer are directly or indirectly connected with at least one additional layer, for instance a printing layer. Examples for security and/or value documents are: identity cards, passports, ID cards, access control cards, visas, tax symbols, tickets, driver's licenses, vehicle documents, banknotes, checks, postage stamps, credit cards, any chip cards and adhesive labels (e.g. for product protection). Such security and/or value documents typically comprise at least one substrate, a printing layer and optionally a transparent cover layer. Substrate, printing layer and cover layer themselves may be composed of a multitude of layers. A substrate is a carrier structure, onto which the printing layer with information, images, patterns and the like is applied. As materials for a substrate, all conventional materials based on paper and/or (organic) polymer can be used. Such a security and/or value document comprises within the total multi-layer structure a structure according to the invention. Beside the structure according to the invention, at least one printing layer is provided, if applicable, several printing layers are provided, which may be applied between the two polymer layers, on an external surface of the structure or on an additional layer connected with the structure.

Figure 1:
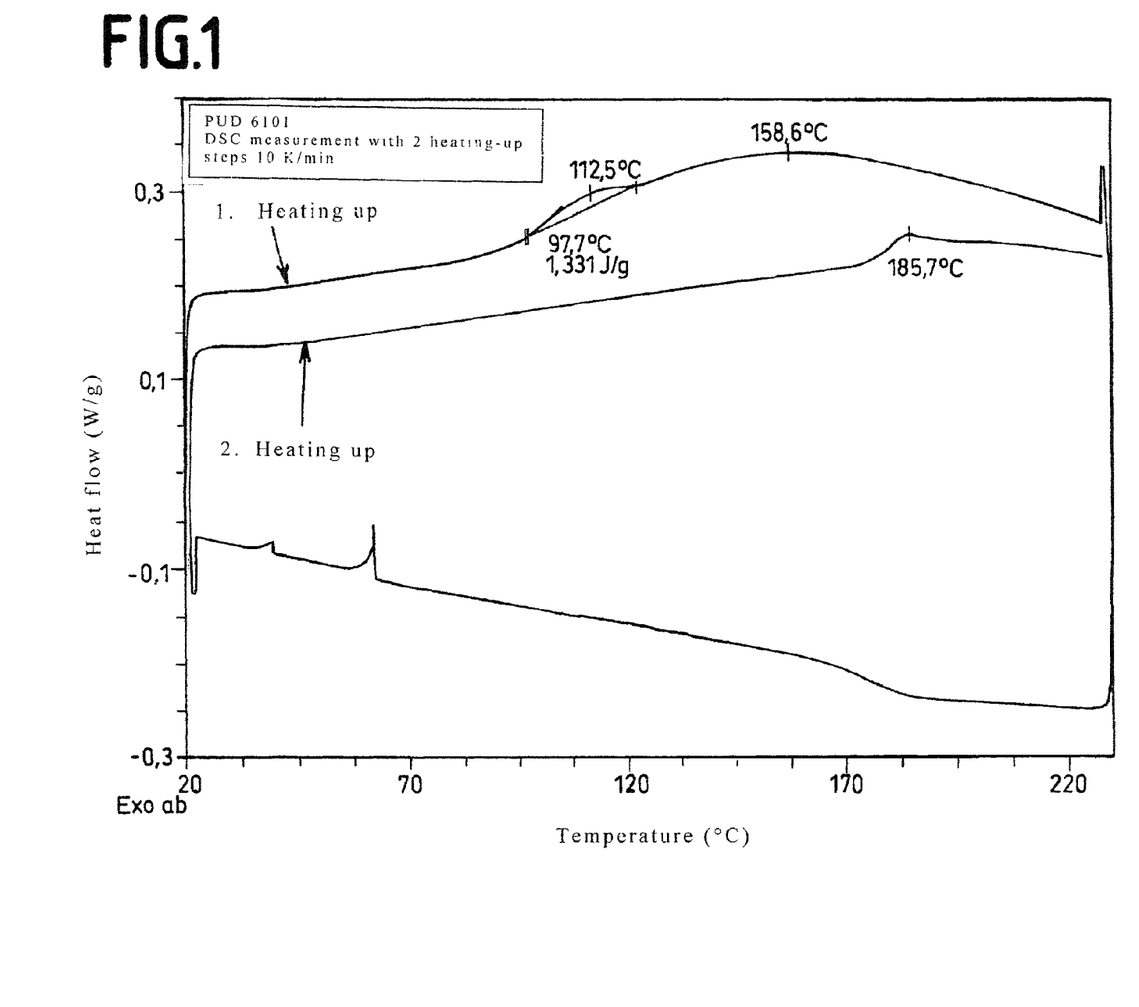
FIG. 1: a differential scanning calorimetry diagram at a layer comprising a polycarbonate derivative used according to the invention.
Figure 2:
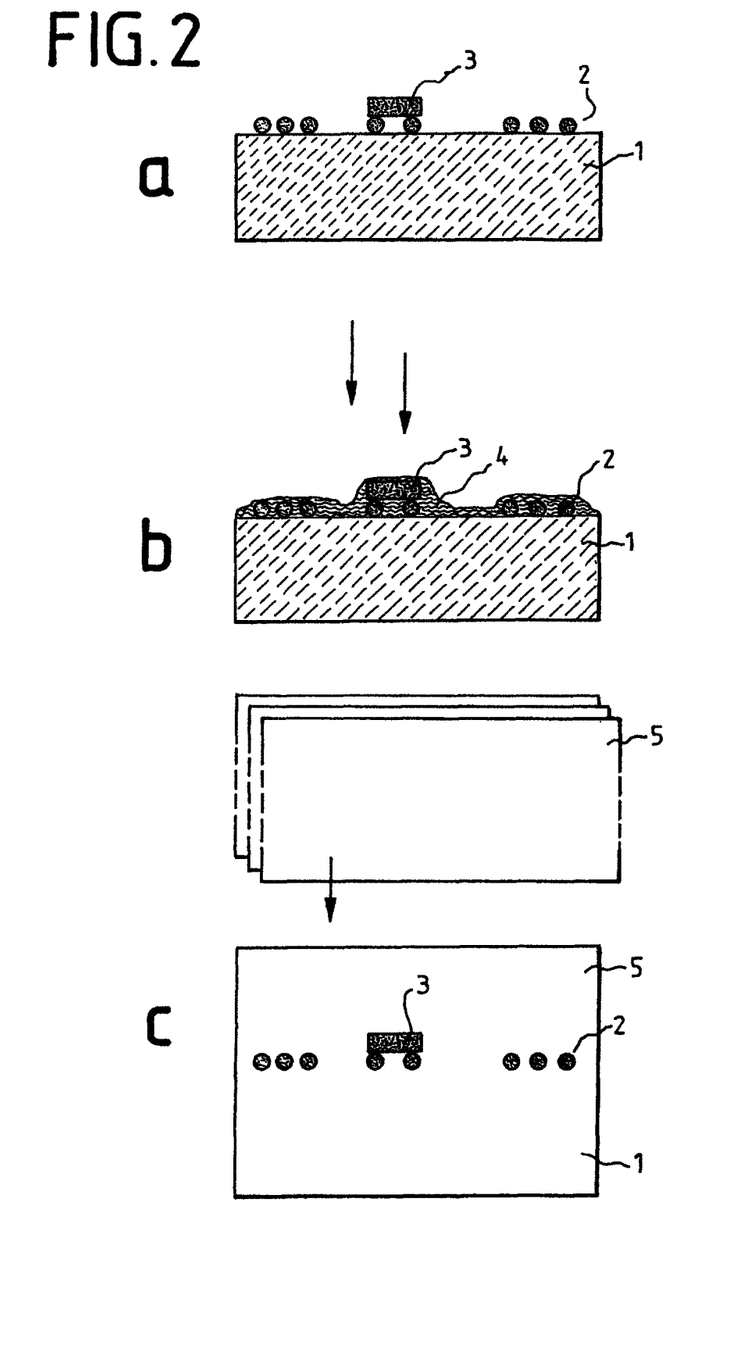
FIG. 2a-2c: process flow of making a multi-layer structure with a semiconductor component.
Figure 3:
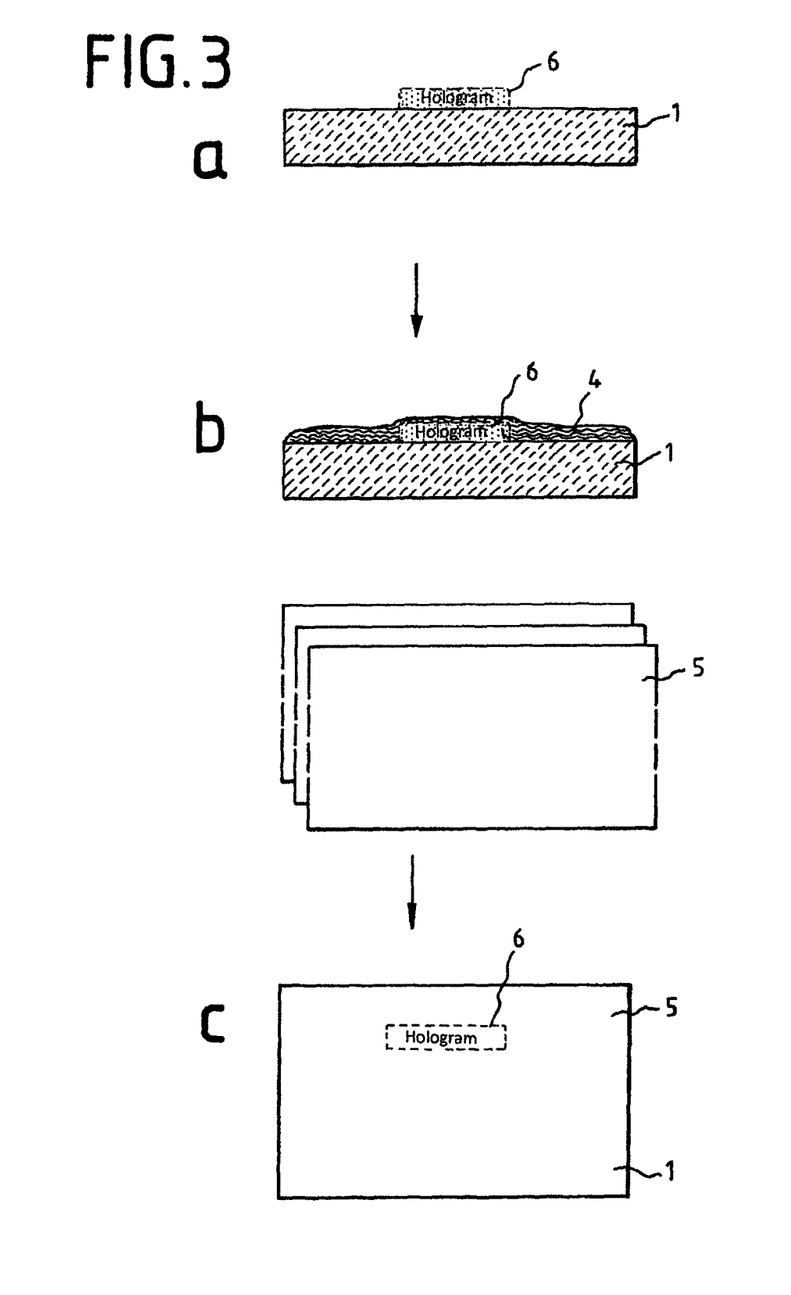
FIG. 3a-3c: process flow of making a multi-layer structure with a volume hologram.
Figure 4:
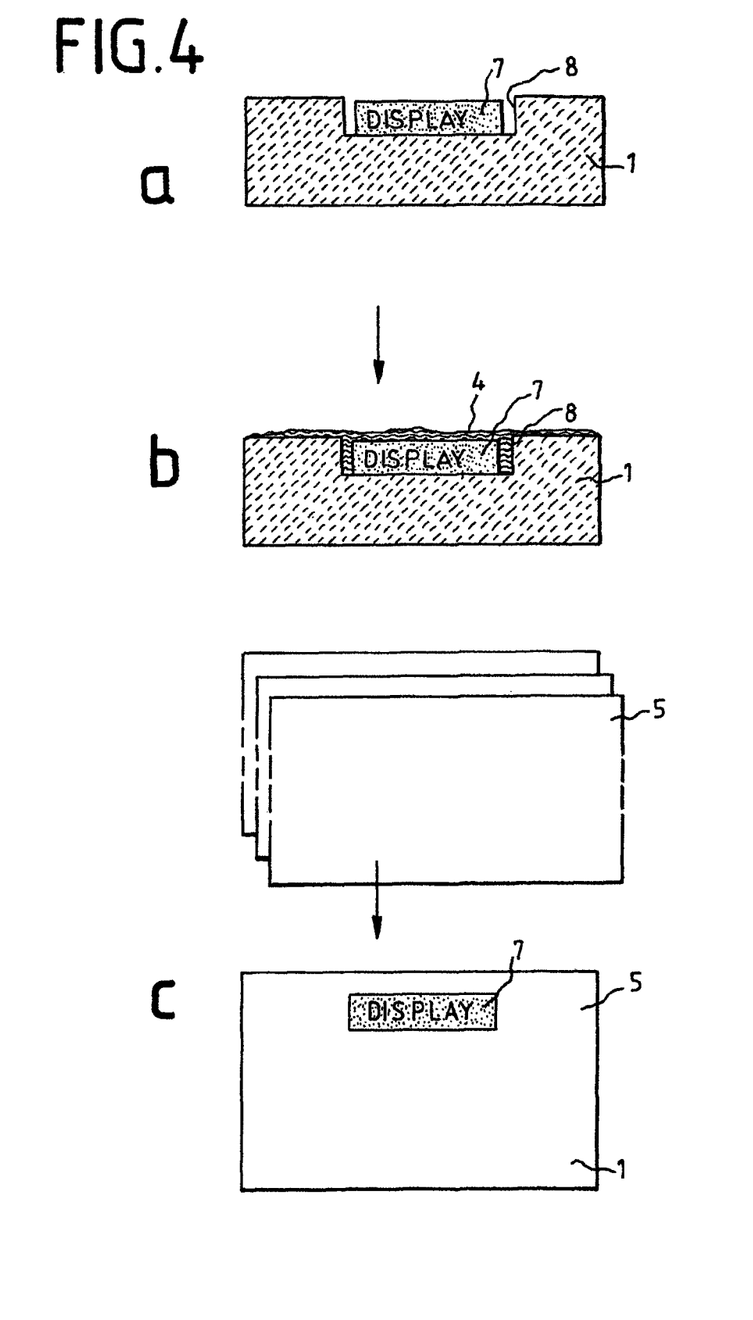
FIG. 4a-4c: process flow of making a multi-layer structure with a display.

In the following, the invention is described in more detail with reference to non-limiting embodiments. There are:

FIG. 1: a differential scanning calorimetry diagram at a layer comprising a polycarbonate derivative used according to the invention, FIG. 2: process flow of making a multi-layer structure with a semiconductor component, FIG. 3: process flow of making a multi-layer structure with a volume hologram, and FIG. 4: process flow of making a multi-layer structure with a display.

Example 1

Making Polycarbonate Derivatives to be Used According to the Invention

Example 1.1

Making a First Polycarbonate Derivative 205.7 g (0.90 mole) bisphenol A (2,2-bis-(4-hydroxyphenyl)-propane, 30.7 g (0.10 mole) 1,1-bis-(4-hydroxyphenyl)-3,3,5-trimethyl cyclohexane, 336.6 g (6 mole) KOH and 2,700 g water are dissolved in an inert gas atmosphere under stirring. Then a solution of 1.88 g phenol in 2,500 ml methylene chloride is added. Into the well stirred solution, 198 g (2 mole) phosgene are introduced at pH 13 to 14 and 21 to 25° C. Then 1 ml ethylpiperidine is added and stirred for another 45 min. The bisphenolate-free aqueous phase is separated, after acidification with phosphoric acid, the organic phase is washed neutrally with water and freed from solvent.

The polycarbonate derivative had a relative solution viscosity of 1.255.

Example 1.2

Making a Second Polycarbonate Derivative

In an analogous manner to Example 1.1, a mixture of 181.4 g (0.79 mole) bisphenol A and 63.7 g (0.21 mole) 1,1-bis-(4-hydroxyphenyl)-3,3,5-trimethyl cyclohexane was reacted to the polycarbonate.

The polycarbonate derivative has a relative solution viscosity of 1.263.

Example 1.3

Making a Third Polycarbonate Derivative

In an analogous manner to Example 1, a mixture of 149.0 g (0.65 mole) bisphenol A and 107.9 g (0.35 mole) 1,1-bis-(4-hydroxyphenyl)-3,3,5-trimethyl cyclohexane was reacted to the polycarbonate.

The polycarbonate derivative had a relative solution viscosity of 1.263.

Example 1.4

Making a Fourth Polycarbonate Derivative

As in Example 1, a mixture of 205.7 g (0.90 mole) bisphenol A and 30.7 g (0.10 mole) 1,1-bis-(4-hydroxyphenyl)-3,3,5-trimethyl cyclohexane was reacted to the polycarbonate.

Example 1.5

Making a Fifth Polycarbonate Derivative

As in Example 1, a mixture of 181.4 g (0.79 mole) bisphenol A and 63.7 g (0.21 mole) 1,1-bis-(4-hydroxyphenyl)-3,3,5-trimethyl cyclohexane was reacted to the polycarbonate.

Example 2

Making a Liquid Preparation Used According to the Invention

As a preparation to be applied by printing techniques, for instance by means of silk-screen printing, the following solution is prepared: 17.5 weight parts of the polycarbonate from Example 1.3 and 82.5 weight parts of the following solvent mixture comprising:

| | |
|---|---|
| Mesitylene | 2.4 |
| 1-methoxy-2-propanolacetate | 34.95 |
| 1,2,4-trimethylbenzene | 10.75 |
| Ethyl-3-ethoxypropionate | 33.35 |
| Cumol | 0.105 |
| Solvent naphtha | 18.45 |

A colorless, highly viscous solution with a solution viscosity of 800 mPas at 20° C. was obtained.

Example 3

Measuring the Glass Temperature of a Coating Comprising a Polycarbonate Derivative from Example 3

A solution of the polycarbonate derivative of Example 1.3 in a mixture of solvents of Example 2 was made, the share of the polycarbonate derivative being 10 wt % and the share of the mixture of solvents being 90%.

The obtained solution was printed by means of silk-screen printing on a glass plate, such that dry layer thicknesses of 5 μm resulted. The coating was dried for 1 hour at 100° C. in the dry box. Then the dried film was removed from the glass plate and investigated by means of differential scanning calorimetry (DSC).

After drying, a softening temperature of $T_g=112°$ C. is detected after the first heating-up step. Only after the cooling-off and second heating-up steps, the expected transitions at $T_g=185°$ C. resp. are observed. The DSC (differential scanning calorimetry) diagram is shown in FIG. 1. The low $T_g$ value at the first heating-up step permits a comparably low temperature during the lamination.

Example 4

Making Structures According to the Invention

A polycarbonate film 1 Makrofol® 6-2 (thickness approx. 100 μm) is covered with elements of a transponder antenna 2 made from copper and silver paste (FIG. 2a). The elements of the transponder antenna 2 have a thickness of approx. 12 μm. On the given contact region of the transponder antenna 2, a semiconductor component 3, a 15 μm thick so-called flex chip controlling the electronic transponder functions, is arranged (FIG. 2a). Now, the side of the polycarbonate film 1 provided with the mentioned components 2, 3 is provided by means of silk screen printing with a layer 4 from the composition according to Example 2 (FIG. 2b). Silk screen printing is made twice. Then drying is made under air atmosphere at 100° C. for 60 min. A layer thickness of approx. 3.3 μm of the dried polycarbonate derivate (FIG. 2b) results. The side of the polycarbonate film 1 with the components 2, 3 and the polycarbonate derivative layer 4 is covered with another polycarbonate film 5 Makrofol® 6-2 (thickness approx. 100 μm), and the thus resulting structure is laminated with, if applicable, further stacked polymer layers in a conventional industrial laminating press under the action of usual pressures (approx. 5 bars) and at about 160° C. to 200° C. and more (FIG. 2c).

Comparative experiments were made in a corresponding manner, however without the layer from the polycarbonate derivative 4.

Whereas the yield of operable components in the process according to the invention was approx. 75%, the method without the polycarbonate derivative resulted in a yield of approx. 25% only.

An optical investigation of the structure did not show any recognizable phase limit in the regions, where the two polycarbonate films 1, 5 were directly (or only by the layer 4 from the polycarbonate derivative) connected with each other. The structure is a monolithic block.

Another example for a component to be laminated is a volume hologram 6, which may for instance have a thickness of 10 μm. Processing takes place in an analogous manner to the above variant, and reference is made to FIGS. 3a-3c. A structure is obtained, the laminated hologram 6 of which meets all requirements with regard to image quality including the colors.

Another example for other components to be laminated may be displays 7 or other electronic components mentioned in the general part of the description. If such a component 7 has a layer thickness of more than 30 μm, it may be recommendable that the component is not placed on the polycarbonate film 1, but into a depression 8 of the polycarbonate film 1. Then the coating with the polycarbonate derivative is made suitably such that in the depression 8 with the inserted component 7, there are not left any hollow spaces, but a complete filling-up is achieved with the polycarbonate derivative. The respective process flow is shown in FIGS. 4a-4c.

The invention claimed is:

1. A method for making a structure with at least a first polymer layer and a second polymer layer, each made from a polycarbonate polymer based on bisphenol A, wherein in-between the polymer layers a component is arranged, comprising the following steps:
   a) arranging the component on the first polymer layer or placing in a depression of the first polymer layer,
   b) coating the first polymer layer on such side, on which or in which the component is arranged, at least in a region, wherein or whereon the component is arranged, with a liquid preparation comprising a solvent and a polycarbonate derivative based on a geminally disubstituted dihydroxydiphenyl cycloalkane,
   c) optionally, drying after step b),
   d) placing the second polymer layer on the first polymer layer, and covering the component,
   e) laminating the first polymer layer and the second polymer layer with each other under pressure, at a temperature from 120° C. to 220° C. and for a defined time.

2. The method according to claim 1, wherein the component is an electronic component.

3. The method according to claim 1, wherein the polycarbonate derivative has an average molecular weight (mean weight) of at least 10,000.

4. The method according to claim 1, wherein the polycarbonate derivative comprises functional carbonate structure units of formula (I), (I)

Wherein $R^1$ and $R^2$ are independently from each other hydrogen, halogen, $C_1$-$C_8$ alkyl, $C_5$-$C_6$ cycloalkyl, $C_6$-$C_{10}$ aryl, and $C_7$-$C_{12}$ aralkyl, m is an integer from 4 to 7, $R^3$ and $R^4$ can be individually selected for each X, and independently represent hydrogen or $C_1$-$C_6$ alkyl, X is carbon and n is an integer greater than 20, wherein at least one atom X, $R^3$ and $R^4$ are both alkyl.

5. The method according to claim 4, wherein $R^3$ and $R^4$ are bound to a single atom X or two different atom Xs, and both are alkyl.

6. The method according to claim 4, wherein $R^3$ and $R^4$ are methyl.

7. The method according to claim 4, wherein the X atoms in the alpha position to the diphenyl-substituted C atom (Cl) are not dialkyl-substituted.

8. The method according to claim 4, wherein the X atoms in the beta position to Cl are disubstituted with alkyl.

9. The method according to claim 4, wherein m is 4 or 5.

10. The method according to claim 4, wherein the polycarbonate derivative is based on 4,4'-(3,3,5-trimethyl cyclohexane-1,1-diyl)diphenol, 4,4'-(3,3-dimethyl cyclohexane-1,1-diyl)diphenol, or 4,4'-(2,4,4-trimethyl cyclopentane-1,1-diyl)diphenol.

11. The method according to claim 1, wherein the polycarbonate derivative comprises a copolymer consisting of monomer units M1 based on bisphenol A, and monomer units M2 based on the geminally disubstituted dihydroxydiphenyl cycloalkane, wherein the molar ratio M2/M1 is greater than 0.3.

12. The method according to claim 1, wherein the first polymer layer and the second polymer layer have a glass temperature Tg of more than 145° C.

13. The method according to claim 1, wherein a first polycarbonate layer and a second polycarbonate layer have a thickness, which is identical or different and in a range from 10 to 1,000 μm.

14. The method according to claim 1, wherein the component has a thickness, measured in directions orthogonal to a main face of a polycarbonate layer, is in the range from 0.1 to 50 μm.

15. The structure produced by the method according to claim 1.

16. The method according to claim 1, wherein the component is a volume hologram.

17. The method according to claim 1, wherein the polycarbonate derivative has an average molecular weight (mean weight) of between 20,000 to 300,000.

18. The method according to claim 4, wherein the halogen is chlorine or bromine.

19. The method according to claim 4, wherein the $C_7$-$C_{12}$ aralkyl is phenyl-$C_1$-$C_4$ alkyl.

20. The method according to claim 4, wherein the $C_7$-$C_{12}$ aralkyl is benzyl.

21. The method according to claim 4, wherein the m is 4.

22. The method according to claim 11, wherein the monomer units M2 is 4,4'-(3,3,5-trimethyl cyclohexane-1,1-diyl) diphenol.

23. The method according to claim 11, wherein the molar ratio M2/M1 is greater than 0.4.

24. The method according to claim 11, wherein the molar ratio M2/M1 is greater than 0.5.

25. The method according to claim 13, wherein the range is from 20 to 200 μm.

26. The method according to claim 14, wherein the range is from 1 to 30 μm.

27. A structure comprising at least one first polycarbonate layer, a second polycarbonate layer, and a component arranged between the first polycarbonate layer and the second polycarbonate layer and an intermediate layer connecting the first polycarbonate layer with the second polycarbonate layer and comprising a polycarbonate derivative based on a geminally disubstituted dihydroxydiphenyl cycloalkane, wherein the polycarbonate layers and the intermediate layer are firmly bonded with each other.

* * * * *